(12) United States Patent  
Baran et al.

(10) Patent No.: US 7,984,449 B2  
(45) Date of Patent: Jul. 19, 2011

(54) IN-BAND COMMUNICATION WITH VIRTUAL MACHINES VIA A HYPERVISOR MESSAGE BUS

(75) Inventors: Evren O. Baran, Port Ewen, NY (US); Eli M. Dow, Poughkeepsie, NY (US); Kyle M. Smith, Poughkeepsie, NY (US); Ashwin Venkatraman, Beacon, NY (US)

(73) Assignee: International Business Machines Corporation, Armonk, NY (US)

( * ) Notice: Subject to any disclaimer, the term of this patent is extended or adjusted under 35 U.S.C. 154(b) by 1007 days.

(21) Appl. No.: 11/838,958

(22) Filed: Aug. 15, 2007

(65) Prior Publication Data

US 2009/0049453 A1 Feb. 19, 2009

(51) Int. Cl.
*G06F 9/44* (2006.01)
*G06F 9/455* (2006.01)

(52) U.S. Cl. ............................................. 719/313; 718/1
(58) Field of Classification Search .............. 718/1, 100; 719/310, 312, 313
See application file for complete search history.

(56) References Cited

U.S. PATENT DOCUMENTS

| | | | |
|---|---|---|---|
| 5,996,026 A * | 11/1999 | Onodera et al. | 710/3 |
| 6,859,928 B2 | 2/2005 | Wright | |
| 7,069,442 B2 * | 6/2006 | Sutton et al. | 713/179 |
| 2002/0173863 A1 | 11/2002 | Imada et al. | |
| 2004/0221290 A1 | 11/2004 | Casey et al. | |
| 2004/0230712 A1 | 11/2004 | Belmar et al. | |
| 2005/0132367 A1 * | 6/2005 | Tewari et al. | 718/1 |
| 2006/0136912 A1 | 6/2006 | Robinson et al. | |
| 2006/0253706 A1 | 11/2006 | Roberts et al. | |
| 2006/0265711 A1 | 11/2006 | Bantz et al. | |
| 2007/0022427 A1 | 1/2007 | Arndt | |
| 2007/0050764 A1 | 3/2007 | Traut | |
| 2007/0067435 A1 | 3/2007 | Landis et al. | |
| 2007/0171921 A1 * | 7/2007 | Wookey et al. | 370/401 |
| 2007/0180447 A1 * | 8/2007 | Mazzaferri et al. | 718/1 |
| 2007/0180448 A1 * | 8/2007 | Low et al. | 718/1 |
| 2007/0180449 A1 * | 8/2007 | Croft et al. | 718/1 |
| 2007/0180450 A1 * | 8/2007 | Croft et al. | 718/1 |
| 2007/0186212 A1 * | 8/2007 | Mazzaferri et al. | 718/1 |
| 2007/0198656 A1 * | 8/2007 | Mazzaferri et al. | 709/218 |
| 2008/0155223 A1 * | 6/2008 | Hiltgen et al. | 711/173 |

FOREIGN PATENT DOCUMENTS

JP 2005135137 5/2005

* cited by examiner

*Primary Examiner* — Van H Nguyen
(74) *Attorney, Agent, or Firm* — Cantor Colburn LLP; Steven Chiu

(57) ABSTRACT

A method, system, and computer program product for in-band communication with virtual machines via a hypervisor message bus are provided. The method includes establishing communication between a hypervisor and a plurality of virtual machines via a hypervisor message bus, where the hypervisor manages resources in a shared system. The method further includes transmitting a message from the hypervisor to the virtual machines using the hypervisor message bus. The method also includes translating the message within the virtual machines into a display-formatted message for in-band display on one or more user systems, and relaying the display-formatted message from the virtual machines to the one or more user systems to provide in-band communication of the message to one or more users.

20 Claims, 2 Drawing Sheets

IN-BAND COMMUNICATION WITH VIRTUAL MACHINES VIA A HYPERVISOR MESSAGE BUS

BACKGROUND OF THE INVENTION

The present disclosure relates generally to communication between virtual machines in a shared computer system, and, in particular, to in-band communication with virtual machines via a hypervisor message bus.

A shared computer system often supports a number of different guest operating systems concurrently using virtual machines. Virtual machines can be in the form of virtual machine guests, logical partitions (LPARs), or other isolation techniques. A shared computer system may also employ other containers executing discrete and unrelated tasks. In such a collaborative shared-physical-resource environment, testing and workloads can be disrupted in non-obvious ways during development on a shared computer system. For example, one virtual machine can execute a heavy workload that impacts performance in another virtual machine instance. This type of cross virtual machine impact can occur when soft limits are used for resource allocation across a single physical machine. However, during development, shared computer systems often do not use hard resource limiting, as issues typically arise in a limited number of circumstances (e.g., server contention for resources at the start of a heavy workload), and hard resource limiting can get in the way of effective testing. Additionally, all virtual machines on a shared computer system can be impacted when maintenance requires system-wide actions, such as halting the entire physical machine.

One problem that exists today is that users of shared computer systems are typically forced to subscribe to mailing lists describing pre-planned events that will impact system performance. More often than not, the users are given only a very short amount of time to react, and the system can become unavailable before messages about the outage are indirectly relayed to the users through e-mail or telephone calls. Users can be notified in general that they have e-mail waiting, but by the time the users receive and read the notification, it may be too late. Moreover, when a user plans on performing testing or performing a task on the shared computer system that will likely impact other virtual machines currently executing, the user may not have an adequate means of notifying other users of the impending problem due to incompatibilities and communication issues between each virtual machine. Thus, present communication mechanisms and shared computer systems are not flexible, nor dynamic enough to cope with the ever changing needs of communicating information to users in real-time across multiple virtual machines. It would be beneficial to have the ability to send notification messages directly into virtual machines (i.e., in band) for display to users in order to minimize delays and ensure that targeted users are informed of potential or actual issues in a timely manner. Accordingly, there is a need in the art for a messaging system for in-band communication with virtual machines executing on a shared computer system.

BRIEF SUMMARY OF THE INVENTION

Embodiments of the invention include a method for in-band communication with virtual machines via a hypervisor message bus. The method includes establishing communication between a hypervisor and a plurality of virtual machines via a hypervisor message bus, where the hypervisor manages resources in a shared system. The method further includes transmitting a message from the hypervisor to the virtual machines using the hypervisor message bus. The method also includes translating the message within the virtual machines into a display-formatted message for in-band display on one or more user systems, and relaying the display-formatted message from the virtual machines to the one or more user systems to provide in-band communication of the message to one or more users.

Additional embodiments include a system for in-band communication with virtual machines via a hypervisor message bus. The system includes a host system in communication with one or more user systems, and a hypervisor message bus establishing communication between a hypervisor and a plurality of virtual machines executing upon the host system. The virtual machines receive a message from the hypervisor via the hypervisor message bus, translate the message into a display-formatted message for in-band display on the one or more user systems, and relay the display-formatted message to the one or more user systems to provide in-band communication of the message to one or more users.

Further embodiments include a computer program product for in-band communication with virtual machines via a hypervisor message bus. The computer program product includes a storage medium readable by a processing circuit and storing instructions for execution by the processing circuit for implementing a method. The method includes establishing communication between a hypervisor and a plurality of virtual machines via a hypervisor message bus, where the hypervisor manages resources in a shared system. The method further includes transmitting a message from the hypervisor to the virtual machines using the hypervisor message bus. The method also includes translating the message within the virtual machines into a display-formatted message for in-band display on one or more user systems, and relaying the display-formatted message from the virtual machines to the one or more user systems to provide in-band communication of the message to one or more users.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Exemplary embodiments provide methods, systems and computer program products for in-band communication with virtual machines via a hypervisor message bus. A shared computer system can allow a large number of users to connect remotely for development, test, and execution of software on multiple virtual machines. The users may interface to the shared computer system using various virtual machines supporting specific guest operating systems. For example, the shared computer system could have a Linux® virtual machine and a z/OS® virtual machine instance active simultaneously, with each virtual machine handling multiple users and supporting a variety of text-based interfaces or graphical user interfaces (GUIs). When development, system test, or other activities are performed on the shared computer system, it is possible for a particular user session to demand a large amount of processing throughput, memory, and/or access to input/output (I/O) devices. When such a high demand scenario occurs, there may be an adverse impact to other users of the same virtual machine, as well as other virtual machines. For example, if two users are performing system testing on different virtual machines in the same physical machine, a high-demand process initiated by one system test could cause another system test within a different virtual machine to fail or perform abnormally. Thus, it is important to quickly notify users across active sessions on the virtual machines if there is or will be a known system-wide impact as a byproduct of development, test, or other activities. In exemplary embodiments, an in-band system for communication to users of virtual machine resources using a hypervisor as a message bus is disclosed herein, which enables broadcasts of messages in band to users actively connected to virtual machines executing on the same physical machine. The broadcasts allow numerous users to quickly determine the status of the shared system, as well as improve knowledge as to how a particular system activity impacts other users. The term "in band" refers to an immediate indicator, providing information without the need to open a mail application to read a message. A hypervisor is a low-level application that supports the execution of one or more virtual machines.

Figure 1:
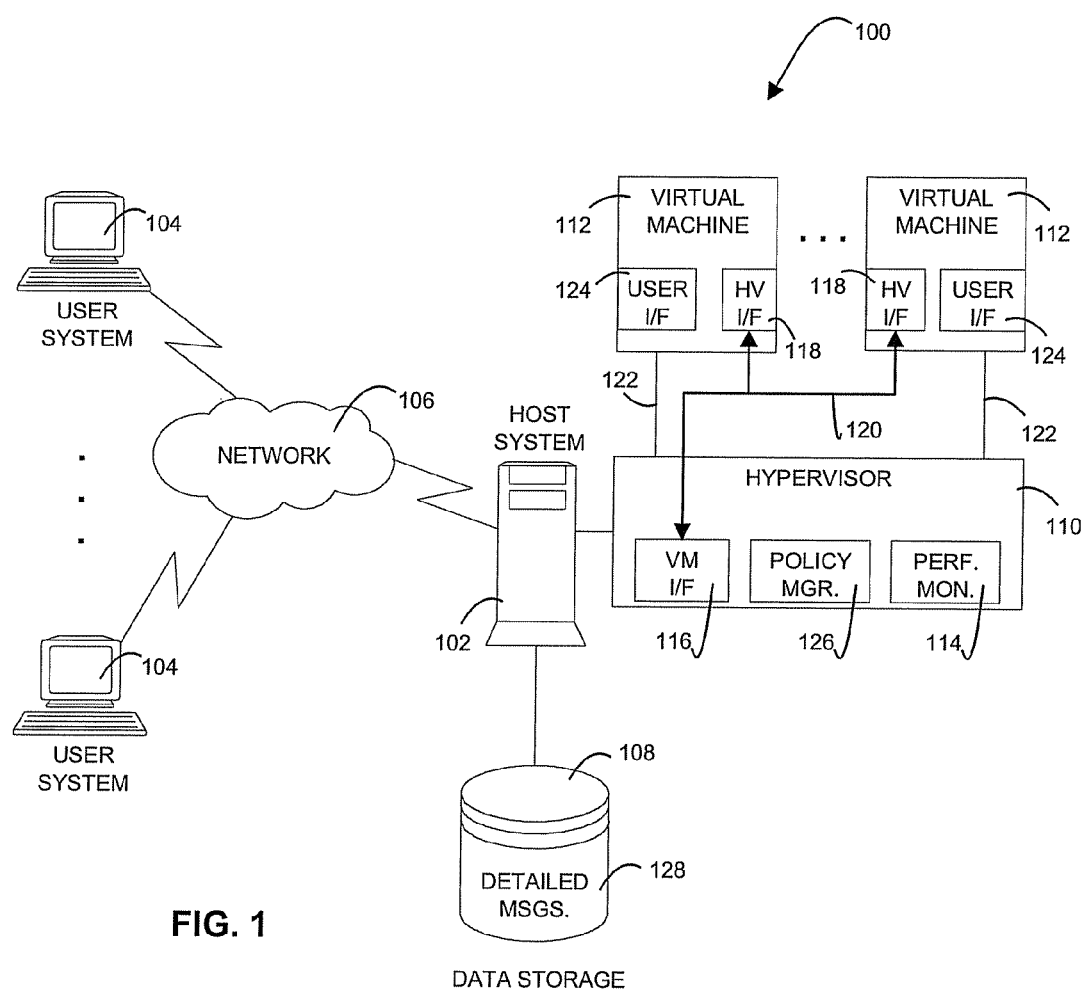
FIG. 1 depicts a system utilizing a hypervisor message bus for in-band communication with virtual machines in accordance with exemplary embodiments.

Turning now to the drawings, it will be seen that in FIG. 1 there is a block diagram of a system 100 upon which a hypervisor message bus for in-band communication with virtual machines is implemented in exemplary embodiments. The system 100 of FIG. 1 includes a host system 102 in communication with user systems 104 over a network 106. In exemplary embodiments, the host system 102 is a high-speed processing device (e.g., a mainframe computer) including at least one processing circuit (e.g., a CPU) capable of reading and executing instructions, and handling numerous interaction requests from the user systems 104 as a shared physical resource. The host system 102 may function as a development and system-testing platform for developing, integrating, and testing various hardware and/or software combinations. The host system 102 can also run other applications, and may serve as a Web server, applications server, and/or a database server. In exemplary embodiments, the user systems 104 comprise desktop, laptop, or general-purpose computer devices that provide an interface for communicating with the host system 102. Users can initiate various tasks on the host system 102 via the user systems 104, such as developing and executing system tests or running application programs. While only a single host system 102 is shown in FIG. 1, it will be understood that multiple host systems can be implemented, each in communication with one another via direct coupling or via one or more networks. For example, multiple host systems may be interconnected through a distributed network architecture. The single host system 102 may also represent a cluster of hosts collectively performing processes as described in greater detail herein.

The network 106 may be any type of communications network known in the art. For example, the network 106 may be an intranet, extranet, or an internetwork, such as the Internet, or a combination thereof. The network 106 can include wireless, wired, and/or fiber optic links.

In exemplary embodiments, the host system 102 accesses and stores data in a data storage device 108. The data storage device 108 refers to any type of storage and may comprise a secondary storage element, e.g., hard disk drive, tape, or a storage subsystem that is internal or external to the host system 102. Types of data that may be stored in the data storage device 108 include, for example, log files and databases. It will be understood that the data storage device 108 shown in FIG. 1 is provided for purposes of simplification and ease of explanation and is not to be construed as limiting in scope. To the contrary, there may be multiple data storage devices 108 utilized by the host system 102.

In exemplary embodiments, the host system 102 executes various applications, including a hypervisor 110 and multiple virtual machines 112. The hypervisor 110 manages access to resources of the host system 102 and serves as a virtual machine monitor to support concurrent execution of the virtual machines 112. While prior art hypervisors may not provide messaging services to send configurable notification messages to guest operating systems running on virtual machines, in exemplary embodiments, the hypervisor 110 includes a message bus feature to send in-band messages to the virtual machines 112. Each virtual machine 112 can support specific guest operating systems and multiple user sessions for executing software written to target the guest operating systems. For example, one virtual machine 112 may support an instance of the Linux® operating system, while a second virtual machine 112 executes an instance of the z/OS® operating system. Other guest operating systems known in the art can also be supported by the hypervisor 110 through the virtual machines 112.

In exemplary embodiments, the hypervisor 110 uses a performance monitor 114 to monitor for unusual activities on the host system 102, such as a spike in processing demand, reduced network 106 throughput, or a high percentage of memory utilization. The hypervisor 110 can compare current utilization measurements provided via the performance monitor 114 to preset or programmable threshold values and trigger an in-band warning message to the virtual machines 112. In exemplary embodiments, the hypervisor 110 communicates in band to the virtual machines 112 using a virtual machine interface 116. The virtual machine interface 116 establishes a communication channel from the hypervisor 110 to a hypervisor interface 118 within each virtual machine 112 using a hypervisor message bus 120. Each hypervisor interface 118 may be a customized module tailored to interface with a specific guest operating system for the corresponding virtual machine 112, e.g., a Linux® compatible module for a Linux® guest operating system virtual machine instance. The communication of messages between the hypervisor 110 and the virtual machines 112 can conform to various protocols known in the art or can employ a customized message exchange protocol. Thus, using the hypervisor message bus 120, messages can be distributed directly to each of the virtual machines 112 through the hypervisor 110.

In exemplary embodiments, the hypervisor 110 manages execution control of each virtual machine 112 through a virtual machine control bus 122. Each virtual machine control bus 122 may handle an exchange of low-level control information, such as interrupts, device driver commands, device driver data, and the like. While each virtual machine control bus 122 can handle low-level information exchange, it is incapable of handling higher-level messages targeted for in-band user display. The hypervisor interface 118 and the virtual machine interface 116 may be tailored to handle exchanges of messages that are targeted for in-band communication to the user systems 104, such as warnings of issues with the host system 102. For example, the hypervisor interface 118 can include a method or function that passes a message payload targeting specific users or systems, selecting a message type from enumerated message types supported by the virtual machine interface 116 of the hypervisor 110. The virtual machine interface 116 may also support sending payloads to the hypervisor interface 118, targeting specific virtual machines 112 over the hypervisor message bus 120. Flow control for message delivery over the hypervisor message bus 120 can be managed using signals, such as interrupts, through the virtual machine control bus 122. A virtual machine 112 that receives a message interrupt may trap the interrupt and determine a specific course of action to process and relay the message.

Upon receiving a message from the hypervisor 110, each virtual machine 112 can relay the message to the user systems 104 that are in communication with the virtual machine 112 through a user interface 124. For example, when the performance monitor 114 detects an abnormal system operating condition, the hypervisor 110 can send a warning message to the virtual machines 112 through the hypervisor message bus 120, and the virtual machines 112 can, in turn, send the warning message to user systems 104 via the respective user interfaces 124. Each user interface 124 may support a variety of display formats or message formats to inform selected users of warnings. In exemplary embodiments, the user interfaces 124 perform as virtual device drivers for the virtual machines 112, with resulting display driver commands translated by the hypervisor 110 and passed from the host system 102 to the user systems 104 via the network 106, where the display driver commands are interpreted for output to the user systems 104. For example, display driver commands sent through the user interface 124 can alter an exported GUI window manager appearance or send messages on a console display to selected user systems 104.

Each virtual machine 112 need not send messages to all user systems 104, but can be selective based upon user privileges for connected users, e.g., only inform "trusted" users. The determination as to privileges of each user may be established through a policy manager 126, as controlled by the hypervisor 110. In alternate exemplary embodiments, the user interface 124 sends a message to the user systems 104 as an instant message to selected user instant messaging accounts, in real time, as determined via the policy manager 126. Warning messages may be issued dynamically from the host system 102 when system resource utilization characteristics are altered beyond predefined levels, or manually by the operators/users when they want to warn or inform users across the virtual machines 112. Broadcasts of messages can be made in band to user systems 104 actively connected to the same physical machine, i.e., the host system 102, based upon the type of message and/or user privileges. In exemplary embodiments, the policy manager 126 organizes user privileges into groups and determines whether specific message codes should be sent to particular groups or users. For example, all users may receive broadcast messages indicating that the host system 102 will be reset at a given time, while only those users registered as Linux® users may receive messages regarding an impending Linux® update. Messages can also be written to the data storage device 108 as detailed messages 128 in a database or log file format. The detailed messages 128 may include one or more reasons for sending a message. For example, when a brief warning message is provided to the user systems 104, greater details may be written to the detailed messages 128, assisting users in understanding the purpose and context of the message.

In exemplary embodiments, a trusted user can use the communication link between the user systems 104, the virtual machines 112, and the hypervisor 110, for communicating messages to other users. For example, if a trusted user plans on executing a system test within a given virtual machine 112 on the host system 102, the trusted user may wish to broadcast a warning message to other users, so they can prepare for the expected impact to the performance of their processes executing upon the host system 102. The trusted user can send the warning message to the user interface 124 of the virtual machine 112 on which the trusted user is currently active. The virtual machine 112 then sends the message to the hypervisor 110 using the hypervisor message bus 120. Upon receiving the warning message, the hypervisor 110 may respond by broadcasting the warning message over the hypervisor message bus 120 to all virtual machines 112 via their respective hypervisor interfaces 118. As previously described, the virtual machines 112 can then relay the warning message via their respective user interfaces 124 to the user systems 104 with which the virtual machines 112 are in communication. Thus, the hypervisor message bus communication structure can perform similar to a local area network (LAN) for communication between users on different virtual machines 112, with central distribution through the hypervisor 110 as a hub/switch for the hypervisor message bus 120. Without the hypervisor message bus 120, the virtual machines 112 are incapable of communicating in band with each other.

Figure 2:
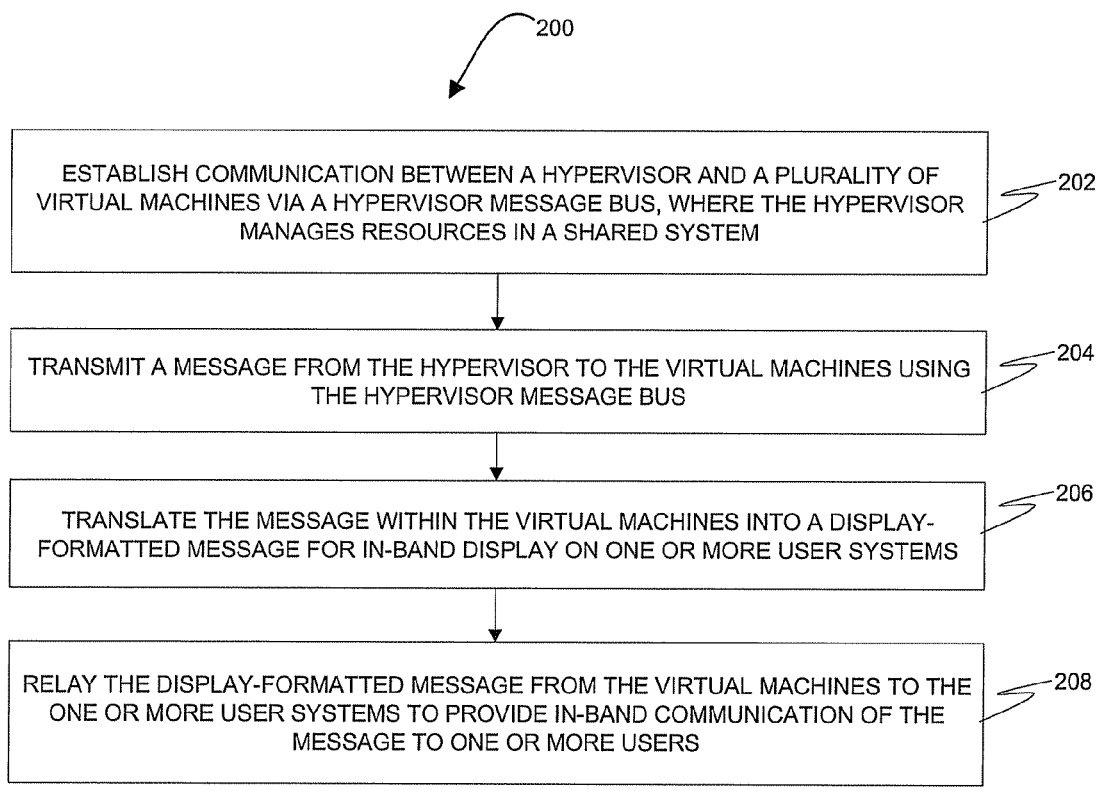
FIG. 2 depicts a process for in-band communication with virtual machines via a hypervisor message bus in accordance with exemplary embodiments.

Turning now to FIG. 2, a process 200 for in-band communication with virtual machines via a hypervisor message bus will now be described in accordance with exemplary embodiments, and in reference to the system 100 of FIG. 1. At block 202, the hypervisor 110 establishes communication between the hypervisor 110 and the virtual machines 112 via the hypervisor message bus 120, connecting the virtual machine interface 116 with the hypervisor interfaces 118. In exemplary embodiments, the hypervisor 110 manages shared resources in the host system 102 and provides monitoring and control functions for the virtual machines 112.

At block 204, the hypervisor 110 transmits a message to the virtual machines 112 using the hypervisor message bus 120. The hypervisor 110 may monitor resources of the host system 102 for resource utilization beyond a predefined threshold value, and generate a warning message of impaired system performance when the resource utilization exceeds the predefined threshold value. In exemplary embodiments, the warning message is the message transmitted from the hypervisor 110 to the virtual machines 112. In alternate exemplary embodiments, the message is originated from a user system 104 in communication with one or more of the virtual machines 112. For example, a user of a user system 104 may create the message as part of an automated or manual process to rapidly inform other users of the host system 102 via in-band communication. The message may also be stored to the data storage device 108 in a log of detailed messages 128, including additional details and/or reasons for each message. In determining which virtual machines 112 or specific users to target with a particular message, the hypervisor 110 may access the policy manager 126 to determine distribution constraints of the message to one or more users. The hypervisor 110 can also limit distribution of the message according to the distribution constraints of the policy manager 126. In exemplary embodiments, the policy manager 126 also controls read and write access to the detailed messages 128 stored in the data storage device 108, such that access is limited to trusted users with proper credentials.

At block 206, the virtual machines 112 translate the message into a display-formatted message for in-band display on one or more user systems 104. At block 208, the virtual machines 112 relay the display-formatted message from the virtual machines 112 to one or more user systems 104 to provide in-band communication of the message to one or more users. The display-formatted message can be in a variety of formats for in-band communication and display to users. For example, the display-formatted message can appear as: a change of font color to a user terminal, a change in a window frame of a GUI, a skull and crossbones graphic, or an instant messenger message targeting the one or more users. When the display-formatted message is an indicator rather than a complete message, a user can access the detailed messages 128 in the data storage device 108 to get further details. Even though the display-formatted message may be an indicator rather than a complete detailed message, the use of visual cues can enable a user to quickly ascertain the type of issue and severity of the issue being communicated. By using the hypervisor message bus 120 to trigger warning messages when there is a system performance issue, users can receive real-time warnings and status, and react accordingly.

Technical effects of exemplary embodiments include in-band communication between a hypervisor and a multiple virtual machines via a hypervisor message bus, propagating messages to users of the virtual machines. Further technical effects include real time notification of system events or warnings through modifying display output to users of the multiple virtual machines. Additional technical effects include enabling selected users to pass messages via the hypervisor message bus to the display of users of virtual machines running different guest operating systems. Advantages include real-time information flow across a shared computer system in multiple virtualized environments. Further advantages include creation of a log of detailed messages to support historical analysis and provide a repository for notifications across multiple virtual machines. Additional advantages include selective notification and distribution of messages according to user/group policies established in a policy manager.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, universal serial bus (USB) flash drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for in-band communication with virtual machines via a hypervisor message bus, comprising:
   establishing communication between a hypervisor and a plurality of virtual machines via a hypervisor message bus, wherein the hypervisor manages resources in a shared system;
   transmitting a message from the hypervisor to the virtual machines using the hypervisor message bus;
   translating the message within the virtual machines into a display-formatted message for in-band display on one or more user systems; and
   relaying the display-formatted message from the virtual machines to the one or more user systems to provide in-band communication of the message to one or more users.

2. The method of claim 1 further comprising:
   monitoring the shared system for resource utilization beyond a predefined threshold value; and
   generating a warning message of impaired system performance when the resource utilization exceeds the predefined threshold value, wherein the warning message is the message transmitted from the hypervisor to the virtual machines.

3. The method of claim 1 further comprising:
   storing the message to a data storage device in a log of detailed messages.

4. The method of claim 1 wherein the display-formatted message is communicated in band to the one or more users as at least one of:
   a change of font color to a user terminal;
   a change in a window frame of a graphical user interface (GUI);
   a skull and crossbones graphic; and
   an instant messenger message targeting the one or more users.

5. The method of claim 1 wherein the message is originated from a user system in communication with one or more of the virtual machines.

6. The method of claim 1 further comprising:
   accessing a policy manager to determine distribution constraints of the message to the one or more users; and
   limiting distribution of the message according to the policy manager distribution constraints.

7. The method of claim 6 wherein the policy manager controls read and write access to detailed messages stored in a data storage device.

8. A system for in-band communication with virtual machines via a hypervisor message bus, comprising:
   a host system in communication with one or more user systems; and a hypervisor message bus establishing communication between a hypervisor and a plurality of virtual machines executing upon the host system, the virtual machines configured to perform a method comprising:
receiving a message from the hypervisor via the hypervisor message bus;
translating the message into a display-formatted message for in-band display on the one or more user systems; and
relaying the display-formatted message to the one or more user systems to provide in-band communication of the message to one or more users.

9. The system of claim 8 wherein the hypervisor further performs:
monitoring the host system for resource utilization beyond a predefined threshold value; and
generating a warning message of impaired system performance when the resource utilization exceeds the predefined threshold value, wherein the warning message is the message transmitted from the hypervisor to the virtual machines.

10. The system of claim 8 wherein the virtual machines further perform:
storing the message to a data storage device in a log of detailed messages.

11. The system of claim 8 wherein the display-formatted message is communicated in band to the one or more users as at least one of:
a change of font color to a user terminal;
a change in a window frame of a graphical user interface (GUI);
a skull and crossbones graphic; and
an instant messenger message targeting the one or more users.

12. The system of claim 8 wherein the message is originated from a user system in communication with one or more of the virtual machines.

13. The system of claim 8 wherein the hypervisor further performs:
accessing a policy manager to determine distribution constraints of the message to the one or more users; and
limiting distribution of the message according to the policy manager distribution constraints.

14. The system of claim 13 wherein the policy manager controls read and write access to detailed messages stored in a data storage device.

15. A computer program product for in-band communication with virtual machines via a hypervisor message bus, the computer program product comprising:
a storage medium readable by a processing circuit and storing instructions for execution by the processing circuit for implementing a method, the method comprising:
establishing communication between a hypervisor and a plurality of virtual machines via a hypervisor message bus, wherein the hypervisor manages resources in a shared system;
transmitting a message from the hypervisor to the virtual machines using the hypervisor message bus;
translating the message within the virtual machines into a display-formatted message for in-band display on one or more user systems; and
relaying the display-formatted message from the virtual machines to the one or more user systems to provide in-band communication of the message to one or more users.

16. The computer program product of claim 15 further comprising:
monitoring the shared system for resource utilization beyond a predefined threshold value; and
generating a warning message of impaired system performance when the resource utilization exceeds the predefined threshold value, wherein the warning message is the message transmitted from the hypervisor to the virtual machines.

17. The computer program product of claim 15 further comprising:
storing the message to a data storage device in a log of detailed messages.

18. The computer program product of claim 15 wherein the display-formatted message is communicated in band to the one or more users as at least one of:
a change of font color to a user terminal;
a change in a window frame of a graphical user interface (GUI);
a skull and crossbones graphic; and
an instant messenger message targeting the one or more users.

19. The computer program product of claim 15 wherein the message is originated from a user system in communication with one or more of the virtual machines.

20. The computer program product of claim 15 further comprising:
accessing a policy manager to determine distribution constraints of the message to the one or more users; and
limiting distribution of the message according to the policy manager distribution constraints.

* * * * *